(12) United States Patent
Danyluk et al.

(10) Patent No.: US 10,386,963 B2
(45) Date of Patent: Aug. 20, 2019

(54) DETECTING CRACKS ON OPERATIVELY COUPLED TOUCHSCREEN DISPLAY USING PRESSURE SENSE

(71) Applicant: International Business Machines Corporation, Armonk, NY (US)

(72) Inventors: Nicholas G. Danyluk, Poughkeepsie, NY (US); Eli M. Dow, Wappingers Falls, NY (US); Kavita Sehgal, Poughkeepsie, NY (US); Diane M. Stamboni, Pleasant Valley, NY (US); Sneha M. Varghese, Fishkill, NY (US); John S. Werner, Fishkill, NY (US); Sarah Wu, Kingston, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 156 days.

(21) Appl. No.: 15/481,137

(22) Filed: Apr. 6, 2017

(65) Prior Publication Data

US 2018/0292942 A1    Oct. 11, 2018

(51) Int. Cl.
*G06F 3/041* (2006.01)
*G06F 3/044* (2006.01)
*G01B 7/15* (2006.01)
*G01L 9/12* (2006.01)

(52) U.S. Cl.
CPC ............. *G06F 3/0418* (2013.01); *G01B 7/15* (2013.01); *G01L 9/12* (2013.01); *G06F 3/044* (2013.01); *G06F 2203/04105* (2013.01)

(58) Field of Classification Search
CPC ................... G06F 3/0418; G06F 3/044; G06F 2203/04105; G01L 9/12; G01B 7/15
See application file for complete search history.

(56) References Cited

U.S. PATENT DOCUMENTS

2003/0043122 A1    3/2003  Suzuki
2003/0214485 A1*  11/2003  Roberts ................. G06F 3/0414
                                                345/173

(Continued)

FOREIGN PATENT DOCUMENTS

EP          1801723 A2    6/2007
WO      2010055195 A1    5/2010

(Continued)

OTHER PUBLICATIONS

Guanghui Xue et al., "Quick Crack Detection of the Large Vibrating Screen Lower Beam Based on Combined Technical Method ofM-MMT and ET", IEEE, 2010, p. 330-335.

*Primary Examiner* — Mark W Regn
(74) *Attorney, Agent, or Firm* — Cantor Colburn; Steven Chiu

(57) ABSTRACT

A method of identifying a crack in a touchscreen display system includes measuring a distance between a first layer of the touchscreen display system and a second layer of the touchscreen display system, detecting a change in the distance at a portion of the touchscreen display system, identifying a crack in the first layer at the portion of the touchscreen display system based on the change in the distance, and adjusting one or more parameters of the touchscreen display system based on the crack in the first layer.

20 Claims, 4 Drawing Sheets

(56) References Cited

U.S. PATENT DOCUMENTS

| | | | |
|---|---|---|---|
| 2006/0087647 A1* | 4/2006 | Bagley | H01L 21/67265 356/237.2 |
| 2010/0123592 A1 | 5/2010 | Nurmi | |
| 2014/0320437 A1 | 10/2014 | Kang | |
| 2015/0193074 A1* | 7/2015 | Cudak | G06F 3/0418 345/173 |
| 2015/0309660 A1* | 10/2015 | Lee | G06F 3/0488 345/174 |

FOREIGN PATENT DOCUMENTS

| | | |
|---|---|---|
| WO | 2014143467 A1 | 9/2014 |
| WO | 2014149558 A1 | 9/2014 |

* cited by examiner

NORMAL TOUCH EVENT

CRACKED COVER GLASS

DETECTING CRACKS ON OPERATIVELY COUPLED TOUCHSCREEN DISPLAY USING PRESSURE SENSE

BACKGROUND

The present invention relates to the art of displays and, more particularly, to a method and system for detecting and reacting to cracks in a touchscreen display.

Touchscreen displays are ubiquitous in modern society. Touchscreens may be found on numerous electronic devices ranging from smartphones, credit card readers, tablets, and the like. Occasionally, touchscreens may become damaged due to sudden impacts, repeated daily use, or the like. If damage results in a crack, touchscreen performance may be reduced. A crack may cause a touch to be offset from an underlying widget or icon. Depending upon the crack severity, it may not be possible for a user to select a desired icon.

SUMMARY

According to an exemplary embodiment, a method of identifying a crack in a touchscreen display system includes measuring a distance between a first layer of the touchscreen display system and a second layer of the touchscreen display system, detecting a change in the distance at a portion of the touchscreen display system, identifying a crack in the first layer at the portion of the touchscreen display system based on the change in the distance, and adjusting one or more parameters of the touchscreen display system based on the crack in the first layer.

According to another aspect of an exemplary embodiment, a system for identifying a crack in a touchscreen display system includes a central processor unit (CPU), a non-volatile memory operatively connected to the CPU, and a crack detection module configured to detect cracks in a layer of the touchscreen display system. The crack detection module includes computer readable program code embodied therewith. The computer readable program code, when executed by the CPU, causes the CPU to measure a distance between a first layer of the touchscreen display system and a second layer of the touchscreen display system, detect a change in the distance at a portion of the touchscreen display system, identify a crack in the first layer at the portion of the touchscreen display system based on the change in the distance, and adjust one or more parameters of the touchscreen display system based on the crack in the first layer.

According to yet another aspect of an exemplary embodiment, a computer program product for detecting cracks in a touchscreen display system includes a computer useable medium including a computer readable program, wherein the computer readable program, when executed on a computer, causes the computer to measure a distance between a first layer of the touchscreen display system and a second layer of the touchscreen display system, detect a change in the distance at a portion of the touchscreen display system, identify a crack in the first layer at the portion of the touchscreen display system based on the change in the distance, and adjust one or more parameters of the touchscreen display system based on the crack in the first layer.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
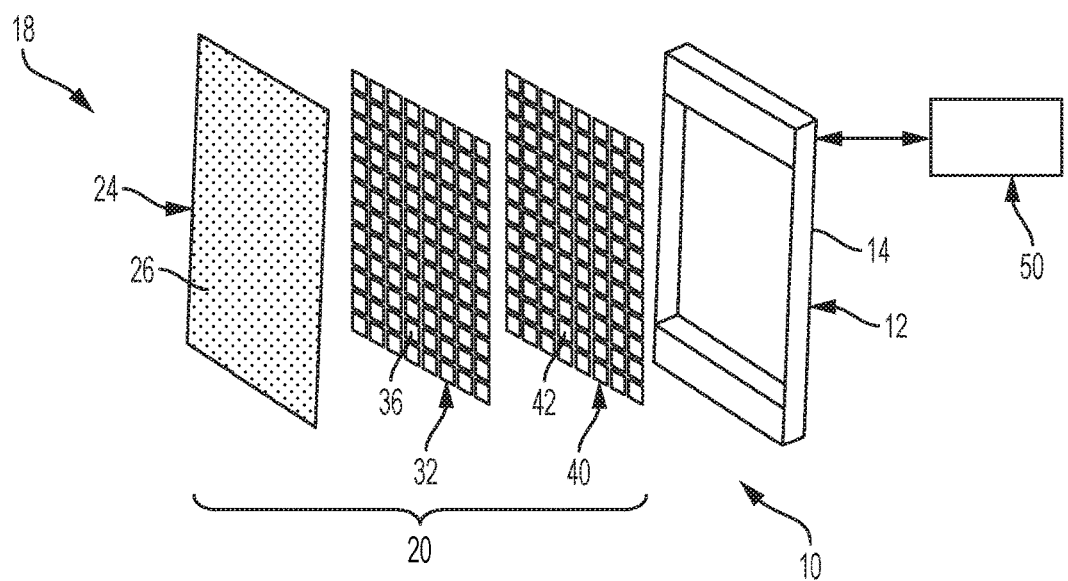
FIG. 1 depicts an electronic device including a touchscreen display system and a system for detecting cracks in the touchscreen display system, in accordance with an aspect of an exemplary embodiment.

An electronic device in accordance with an exemplary embodiment is indicated generally at 10 in FIG. 1. Electronic device 10 is shown in the form of a smart device 12, such as a smartphone. It is to be understood that electronic device may take on a variety of forms including tablets, smart boards, consumer check out devices, or any other device that may employ a touchscreen display. Electronic device 10 includes a housing 14 that supports a touchscreen display system 18 that includes a plurality of screen layers 20.

Touchscreen display system 18 includes a cover glass layer 24 formed from a flexible clear material 26, a capacitive touch display layer 32 including a plurality of capacitive touch sensors 36 and a pressure sensing layer 40 including a plurality of pressure sensors 42. Capacitive touch sensors 36 allow a user to interact with, e.g., touch visual elements (not shown) presented in capacitive touch display layer 32. Pressure sensors 42 measure a force applied to capacitive touch display layer 32. It is to be understood that capacitive touch display layer 32 and pressure sensing layer 40 may each take the form of multiple layers. For example, capacitive touch display layer 32 may include one or more capacitive touch sensing layers and one or more display layers. The pressure sensing layer 40 may include one or more layers supporting various pressure sensors.

Figure 2:
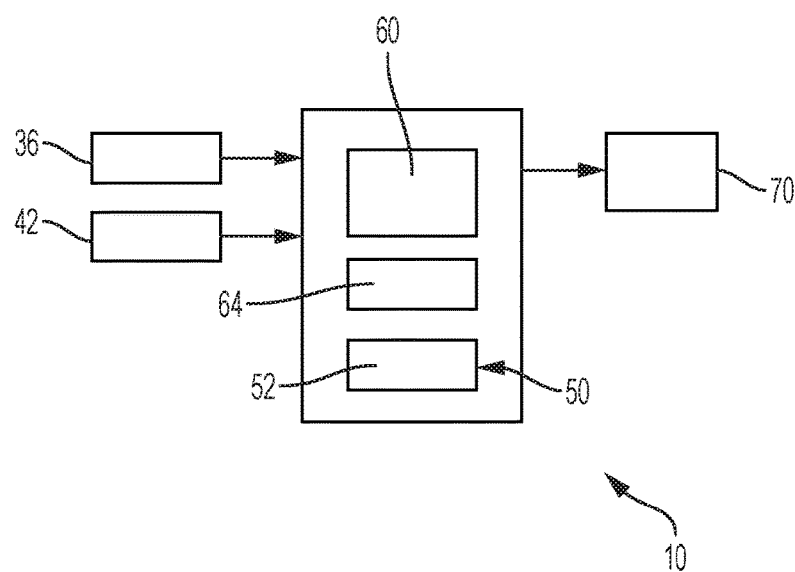
FIG. 2 is a block diagram depicting the system for detecting cracks in the touchscreen display system, in accordance with an aspect of an exemplary embodiment.

In accordance with an aspect of an exemplary embodiment, electronic device 10 includes a crack detection system 50 that may detect and react to cracks which may occur in the cover glass layer 24. The crack detection system 50 may be operatively connected to a central processor unit (CPU) 60 and a non-volatile memory 64 as shown in FIG. 2. Non-volatile memory 64 may take the form of a computer usable medium that stores a computer-readable program code that may be executed by CPU 60. The crack detection system 50 may include a crack detection module 52 that receives inputs from the capacitive touch display layer 32 and/or pressure sensing layer 40 to detect cracks in the cover glass layer 24 as will be detailed below. After detecting that one or more cracks exist, crack detection system 50 may provide an output adjustment 70 that allows a user to continue to interact with electronic device 10.

Figure 3:
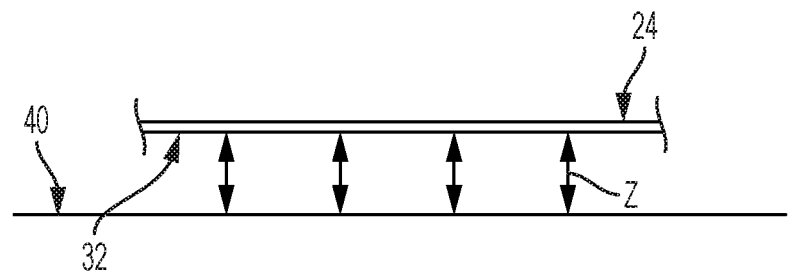
FIG. 3 is a detail view illustrating an undamaged touchscreen system, in accordance with an aspect of an exemplary embodiment.
Figure 4:
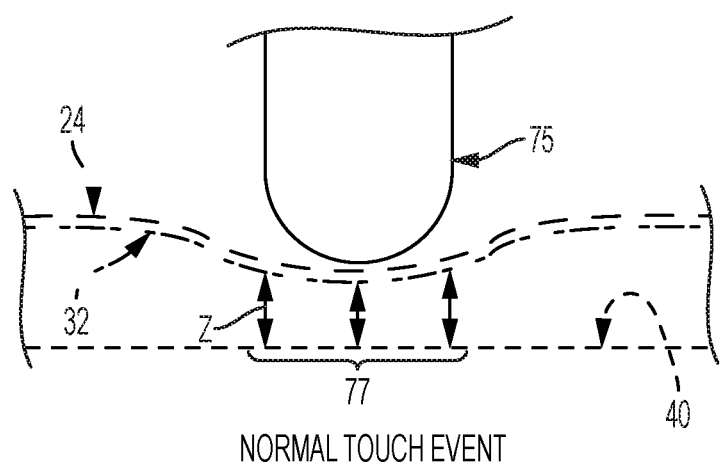
FIG. 4 is a detail view of a normal touch event on the touchscreen display system of FIG. 3, in accordance with an aspect of an exemplary embodiment.

As shown in FIG. 3, crack detection system 50 measures a substantially uniform distance "z" between capacitive touch display layer 32 and pressure sensing layer 40. For example, crack detection system 50 may rely on pressure sensors 42 to derive distance. The distance "z" may be stored in non-volatile memory 64 as a baseline. When a user applies pressure to cover glass 24 with, for example, a finger 75 such as shown in FIG. 4, distance "z" changes in a substantially uniform manner across a touch zone 77.

Figure 5:
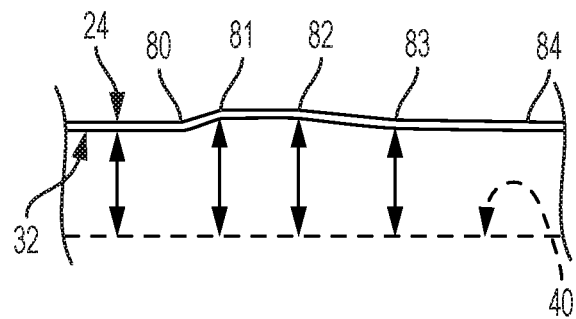
FIG. 5 is a detail view of touchscreen display system including a crack, in accordance with an aspect of an exemplary embodiment.
Figure 6:
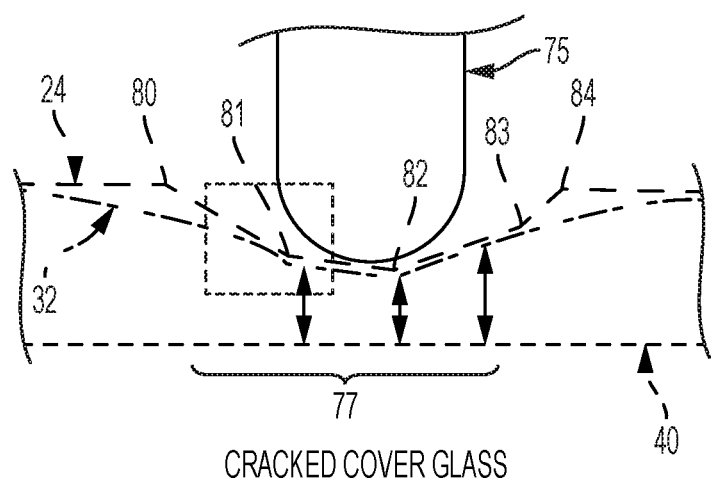
FIG. 6 depicts a touch event on a cracked touchscreen display system, in accordance with an aspect of an exemplary embodiment.
Figure 7:
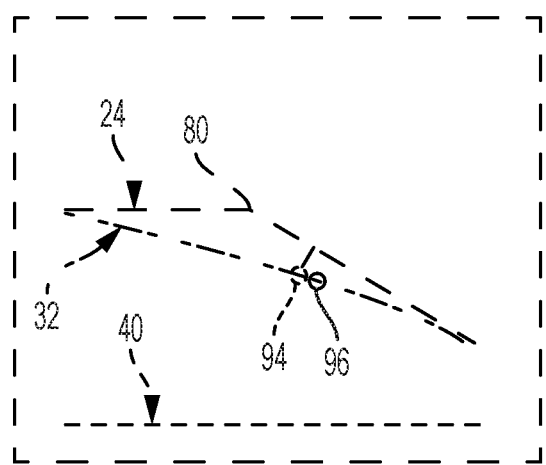
FIG. 7 is a detail view of the cracked touchscreen display system of FIG. 6, in accordance with an aspect of an exemplary embodiment.

In the event that cracks occur in the cover glass layer 24 such as shown at 80, 81, 82, 83, and 84 in FIG. 5, distance "z" will no longer be substantially uniform. That is, localized distance "z" variations will exist at each crack 80-84. When a user applies pressure to cover glass layer 24, distance "z" will vary across touch zone 77 as shown in FIG. 6. As such a sensed touch event location 94, e.g., the touch event location detected by the capacitive touch display layer 32, may be off-set from a desired touch event location 96 as shown in FIG. 7. In such cases, a user may not be able to activate a desired screen widget. Thus, upon detecting that one or more cracks exist, crack detection system 50 may adjust one or more parameters to promote contact with the desired screen widget. For example, crack detection system 50 may determine an adjusted touch event location based on the presence of a crack. In another example, in addition to, or as an alternative to determining an adjusted touch event location, crack detection system 50 may shift a position of the desired screen widget on display system 18 such that a touch event can be properly sensed by capacitive touch display layer 32.

Figure 8:
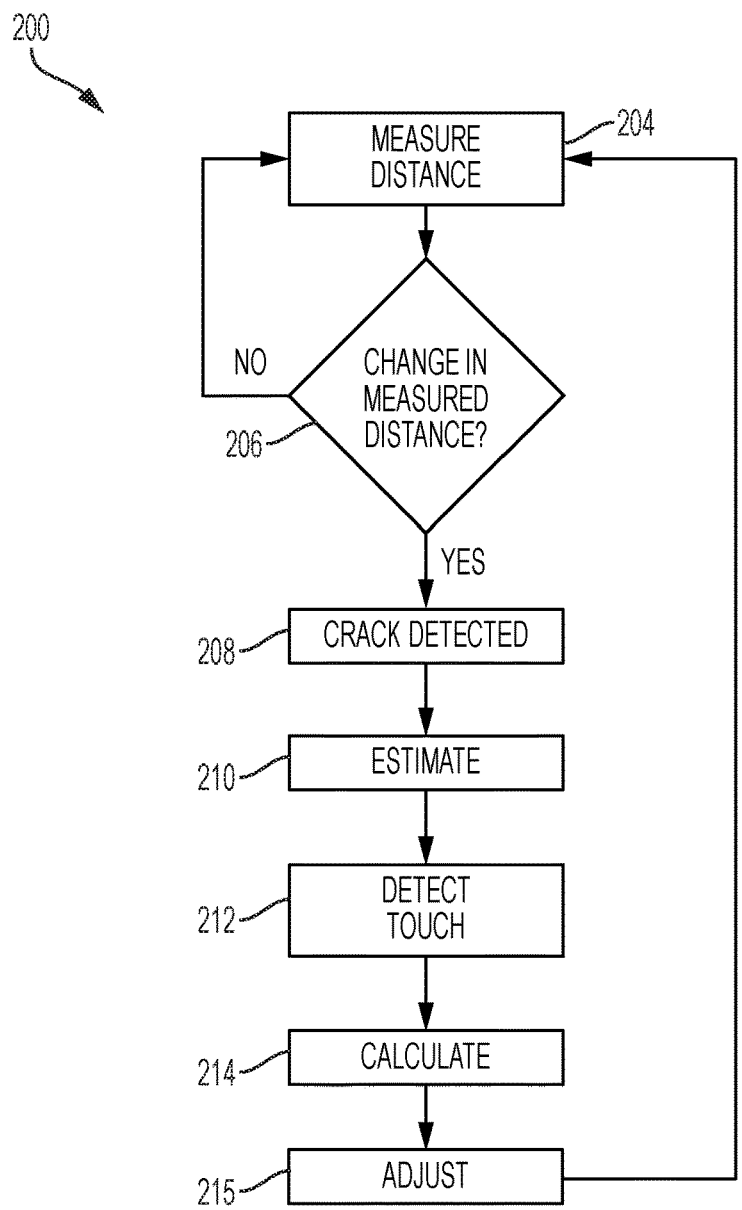
FIG. 8 is a flow chart illustrating a method for detecting cracks in a touchscreen display system, in accordance with an aspect of an exemplary embodiment.

Reference will now follow to FIG. 8 in describing a method 200 of detecting cracks in the cover glass layer 24. At block 204, distance "z" is measured at a plurality of locations across display system 18 to establish a baseline which may be stored in non-volatile memory 64. At block 206, crack detection system 50 periodically re-measures distance "z" to determine whether any changes have occurred to the baseline stored in non-volatile memory 64 during a non-touch event. If changes have occurred, a new baseline may be stored in non-volatile memory 64 and a crack is indicated at block 208 and at block 210, an adjusted screen parameter may be estimated.

Thus, upon detecting a touch at block 212 crack detection system 50 may determine a substantially exact position of capacitive touch layer 32 and thereafter calculate a more accurate adjusted screen parameter at block 214 that may also be stored in non-volatile memory 64. The adjusted screen parameter may represent a re-calibration of a perceived touch event location to account for deviations in distance "z" resulting from the presence of one or more cracks. Alternatively, or in addition, the adjustment may represent shifting a re-calibration or shifting of an "xy" position of content such as a screen widget on display system 18 to a modified "xy" position at block 215. In this manner, the user may continue to interact with electronic device 10 with little degradation to performance. Method 200 then returns to block 204.

It is to be understood that the exemplary embodiments describe a system that perceives a presence of one or more cracks on a glass cover layer of an electronic device and also adjusts screen parameters for any input inconsistencies that may occur due to the presence of the one or more cracks. Additionally, it should be understood that upon detecting that a crack may exist, crack detection system 50 may interact with external adware causing push notifications (e.g., targeted screen repair advertisements or replacement device advertisements) to be sent to a user.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of identifying a crack in a touchscreen display system comprising:
   measuring a distance between a first layer of the touchscreen display system and a second layer of the touchscreen display system;
   detecting a change in the distance at a portion of the touchscreen display system;
   identifying a crack in the first layer at the portion of the touchscreen display system based on the change in the distance; and
   adjusting one or more parameters of the touchscreen display system based on the crack in the first layer.

2. The method of claim 1, wherein measuring the distance includes detecting a distance between a display layer of the touchscreen display system and a pressure sensing layer of the touchscreen display system.

3. The method of claim 1, further comprising: determining a change in a touch event location resulting from the crack in the first layer.

4. The method of claim 3, wherein determining the change in touch event location includes calculating a modified "xy" position on the touchscreen display system that is offset from an "xy" position of content presented on the touchscreen display system caused by the crack in the first layer.

5. The method of claim 4, further comprising: re-calibrating the portion of the touchscreen display system based on the modified "xy" position.

6. The method of claim 4, further comprising: shifting an "xy" position of content presented on the touchscreen display system based on the modified "xy" position.

7. The method of claim 1, further comprising:
detecting deviations in the change in distance between the first layer and the second layer of the touchscreen display system; and
adjusting the one or more parameters of the touchscreen display system based on the deviation in the change in distance.

8. A system for identifying a crack in a touchscreen display system comprising:
a central processor unit (CPU);
a non-volatile memory operatively connected to the CPU; and
a crack detection module configured to detect cracks in a layer of the touchscreen display system, the crack detection module including computer readable program code embodied therewith, the computer readable program code, when executed by the CPU, causes the CPU to:
measure a distance between a first layer of the touchscreen display system and a second layer of the touchscreen display system;
detect a change in the distance at a portion of the touchscreen display system;
identify a crack in the first layer at the portion of the touchscreen display system based on the change in the distance; and
adjust one or more parameters of the touchscreen display system based on the crack in the first layer.

9. The system of claim 8, wherein the computer readable program code, when executed by the CPU, causes the CPU to: detect a distance between a display layer of the touchscreen display system and a pressure sensing layer of the touchscreen display system when measuring the distance between the first layer and the second layer.

10. The system of claim 8, wherein the computer readable program code, when executed by the CPU, causes the CPU to: determine a change in a touch event location resulting from the crack in the first layer.

11. The system of claim 10, wherein the computer readable program code, when executed by the CPU, causes the CPU to: calculate a modified "xy" position on the touchscreen display system that is offset from an "xy" position of content presented on the touchscreen display system caused by the crack in the first layer when determining the change in touch event location.

12. The system of claim 11, wherein the computer readable program code, when executed by the CPU, causes the CPU to: re-calibrate the portion of the touchscreen display system based on the modified "xy" position.

13. The system of claim 11, wherein the computer readable program code, when executed by the CPU, causes the CPU to: shift an "xy" position of content presented on the touchscreen display system based on the modified "xy" position.

14. The system of claim 8, wherein the computer readable program code, when executed by the CPU, causes the CPU to:
detect deviations in the change in distance between the first layer and the second layer of the touchscreen display system; and
adjust the one or more parameters of the touchscreen display system based on the deviation in the change in distance.

15. A computer program product for detecting cracks in a touchscreen display system comprising:
a computer useable medium including a computer readable program, wherein the computer readable program, when executed on a computer, causes the computer to:
measure a distance between a first layer of the touchscreen display system and a second layer of the touchscreen display system;
detect a change in the distance at a portion of the touchscreen display system;
identify a crack in the first layer at the portion of the touchscreen display system based on the change in the distance; and
adjust one or more parameters of the touchscreen display system based on the crack in the first layer.

16. The computer program product of claim 15, wherein the computer readable program, when executed by the computer, causes the computer to: detect a distance between a display layer of the touchscreen display system and a pressure sensing layer of the touchscreen display system when measuring the distance between the first layer and the second layer.

17. The computer program product of claim 15, wherein the computer readable program, when executed by the computer, causes the computer to: determine a change in a touch event location resulting from the crack in the first layer.

18. The computer program product of claim 17, wherein the computer readable program, when executed by the computer, causes the computer to: calculate a modified "xy" position on the touchscreen display system that is offset from an "xy" position of content presented on the touchscreen display system caused by the crack in the first layer when determining the change in touch event location.

19. The computer program product of claim 18, wherein the computer readable program, when executed by the computer, causes the computer to: re-calibrate the portion of the touchscreen display system based on the modified "xy" position.

20. The computer program product of claim 18, wherein the computer readable program, when executed by the computer, causes the computer to: shift an "xy" position of content presented on the touchscreen display system based on the modified "xy" position.

* * * * *